United States Patent
Schenkermayr

(10) Patent No.: US 9,643,613 B2
(45) Date of Patent: May 9, 2017

(54) METHOD FOR OPERATING A MOTOR VEHICLE

(71) Applicant: Bayerische Motoren Werke Aktiengesellschaft, Munich (DE)

(72) Inventor: Guenter Schenkermayr, Ertl (AT)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 117 days.

(21) Appl. No.: 14/287,295

(22) Filed: May 27, 2014

(65) Prior Publication Data

US 2014/0277982 A1    Sep. 18, 2014

Related U.S. Application Data

(63) Continuation of application No. PCT/EP2012/073376, filed on Nov. 22, 2012.

(30) Foreign Application Priority Data

Nov. 28, 2011 (DE) .................. 10 2011 087 179

(51) Int. Cl.
*B60W 30/18* (2012.01)
*B60W 10/18* (2012.01)
(Continued)

(52) U.S. Cl.
CPC ...... *B60W 30/18181* (2013.01); *B60W 10/06* (2013.01); *B60W 10/18* (2013.01);
(Continued)

(58) Field of Classification Search
None
See application file for complete search history.

(56) References Cited

U.S. PATENT DOCUMENTS

2004/0254656 A1    12/2004    Wagner et al.
2005/0188695 A1    9/2005    Shirakawa
(Continued)

FOREIGN PATENT DOCUMENTS

CN    1661222 A    8/2005
CN    1956860 A    5/2007
(Continued)

OTHER PUBLICATIONS

Corresponding International Search Report dated Feb. 21, 2013, with English Translation (four (4) pages).
(Continued)

*Primary Examiner* — Mussa A Shaawat
*Assistant Examiner* — Kyung Kim
(74) *Attorney, Agent, or Firm* — Crowell & Moring LLP

(57) ABSTRACT

A method is provided for operating a motor vehicle having at least one drive unit which is suitable for providing a drive torque. A drive torque prompted by the driver by way of the accelerator pedal, in the case of a rapid change of the accelerator pedal position, is filtered by way of a guidance former and/or an accelerator pedal filter or its rate of change is limited, so that a slower drive torque reduction or drive torque buildup will occur. In the case of a prompted reduction of the drive torque, simultaneously with the slowed-down drive torque reduction, a corresponding triggering of a vehicle brake system is carried out for achieving a predefined vehicle deceleration.

9 Claims, 2 Drawing Sheets

(51) Int. Cl.
*B60W 30/20* (2006.01)
*B60W 10/06* (2006.01)
*B60W 50/06* (2006.01)

(52) U.S. Cl.
CPC ...... *B60W 30/18072* (2013.01); *B60W 30/20* (2013.01); *B60W 50/06* (2013.01); *B60W 2030/206* (2013.01); *B60W 2540/106* (2013.01); *B60W 2720/106* (2013.01); *B60Y 2400/435* (2013.01)

(56) References Cited

U.S. PATENT DOCUMENTS

| | | | |
|---|---|---|---|
| 2007/0216221 A1* | 9/2007 | Zillmer | B60K 6/48 303/151 |
| 2008/0216780 A1 | 9/2008 | Nakamura | |
| 2009/0090572 A1 | 4/2009 | Huber et al. | |
| 2011/0133677 A1 | 6/2011 | Franke | |
| 2011/0163727 A1 | 7/2011 | Hummel | |
| 2011/0288709 A1 | 11/2011 | Maass | |
| 2012/0109475 A1 | 5/2012 | Kanazawa et al. | |
| 2015/0135706 A1* | 5/2015 | Takao | F02B 37/18 60/602 |

FOREIGN PATENT DOCUMENTS

| | | |
|---|---|---|
| CN | 102089963 A | 6/2011 |
| CN | 102164798 A | 8/2011 |
| CN | 102245886 A | 11/2011 |
| DE | 195 34 633 A1 | 12/1996 |
| DE | 199 49 449 A1 | 5/2001 |
| DE | 100 24 269 A1 | 12/2001 |
| DE | 101 11 271 A1 | 9/2002 |
| DE | 10 2004 025 830 A1 | 8/2006 |
| DE | 10 2005 060 858 A1 | 6/2007 |
| DE | 10 2007 012 303 A1 | 9/2008 |
| DE | 10 2008 054 451 A1 | 6/2010 |
| EP | 1 515 021 A1 | 3/2005 |
| JP | 2011-63089 A | 3/2011 |

OTHER PUBLICATIONS

German Office Action dated Feb. 27, 2012, with English Translation (ten (10) pages).
Chinese Office Action issued in counterpart Chinese Application No. 201280058137.1 dated Dec. 30, 2015, with English translation (thirteen (13) pages).
Chinese Office Action issued in counterpart Chinese Application No. 201280058137.1 dated Sep. 8, 2016, with English translation (thirteen (13) pages).

* cited by examiner

METHOD FOR OPERATING A MOTOR VEHICLE

CROSS REFERENCE TO RELATED APPLICATIONS

This application is a continuation of PCT International Application No. PCT/EP2012/073376, filed Nov. 22, 2012, which claims priority under 35 U.S.C. §119 from German Patent Application No. 10 2011 087 179.9, filed Nov. 28, 2011, the entire disclosures of which are herein expressly incorporated by reference.

BACKGROUND AND SUMMARY OF THE INVENTION

The invention relates to a method of operating a motor vehicle having at least one drive unit which is suitable for providing a drive torque.

When a load shedding is prompted by the driver of a motor vehicle by releasing the accelerator pedal and is implemented by a spontaneous reduction of the drive torque, this causes a rapid relaxation of the elastic drive train. As a result of the vehicle inertia, a tensioning of the drive train in the opposite direction occurs; i.e. the vehicle drives the engine. By means of this rapid reduction of the drive torque and the bump stop change in the drive train, a pronounced negative engine rotational speed gradient will briefly occur without immediately causing a perceptible vehicle deceleration.

If the vehicle is equipped with a turbocharger, this pronounced negative engine rotational speed, however, has the effect that the air flow delivered by the turbocharger, which, because of inertias of the turbocharger and of the air flow even in this phase does not yet drop significantly, can no longer be absorbed by the internal-combustion engine because of the abruptly reduced rotational speed. This results in excessive pressure conditions or pressure pulsations in the air flow guided between the exhaust gas turbocharger and the internal-combustion engine. This has the effect that the already compressed air flows back in a pulsed manner through the exhaust gas turbocharger in the annular gap between the compressor wheel and the compressor housing toward the intake side. This effect is called exhaust gas turbocharger pumping or surging.

The serious negative effects of exhaust gas turbocharger pumping are manifested mainly by an intense noise development and a massive stressing of the components in the intake air guide.

Since, in the case of modern vehicles, the course of the engine torque during a load shedding (thus, a transition from a driven operation to a coasting operation) can be decisively influenced by a so-called torque guidance former and/or a filtering of the accelerator pedal movement such that a delayed or softer drive torque reduction or drive torque buildup occurs, as a result of a corresponding design or adaptation of the guidance former (forming of the torque jump defined by the accelerator pedal, for example, by a PT1 or PDT1 filter and/or a ramp) and/or by an adaptation of the filtering of the accelerator pedal, the above-mentioned problem can be minimized or even prevented. However, by way of the softer drive torque reduction or drop, a slower vehicle deceleration will also occur. Particularly in the case of sport vehicles, it has to be ensured, however, that, when the accelerator is released, no so-called "pushing-along" of the vehicle will occur, but rather a spontaneous response in the form of a clearly perceptible vehicle deceleration takes place.

Methods of operating a motor vehicle, whereby, for the triggering of a torque increase or torque reduction, the drive torque is influenced by a guidance former, are known, for example, from German Patent Documents DE 10 2005 060 858 A1 and DE 10 2008 054 451 A1.

It is an object of the invention to provide a method of operating a motor vehicle which, in the event of load shedding substantially prevents a so-called exhaust gas turbocharger pumping on the one hand but, at the same time, also ensures a spontaneous response expected by the driver with respect to the vehicle deceleration.

This and other objects are achieved by a method of operating a motor vehicle having at least one drive unit which is suitable for providing a drive torque. A drive torque prompted by the driver by way of the accelerator pedal, in the case of a rapid change of the accelerator pedal position, is filtered by way of a guidance former and/or an accelerator pedal filter (or its rate of change is limited), so that a slower drive torque reduction or drive torque buildup will occur. In the case of a prompted reduction of the drive torque, simultaneously with the slowed-down drive torque reduction, a corresponding triggering of a vehicle brake system is carried out for achieving a specified vehicle deceleration.

The starting point of the invention, in principle, is a known method of operating a motor vehicle having at least one drive unit, wherein a drive torque prompted by the driver by way of the accelerator pedal, particularly in the case of a rapid change, is filtered by way of a guidance former and/or an accelerator pedal filter, or its rate of change is limited, so that a softer or slower drive torque reduction or drive torque buildup will occur. This means that the implementation of the prompted drive torque change is influenced by a guidance former and/or accelerator pedal filter such that, particularly in the case of a prompted drive torque reduction, the drive torque is reshaped in the direction of a softer torque drop. Ideally, an influencing of the drive torque gradient takes place to such an extent that no air flows back in the turbocharger, and therefore the above-described so-called exhaust gas turbocharger pumping is substantially prevented.

However, in order to, at the same time, prevent a pushing-along of the drive unit caused by the slower drive torque reduction, and to be able to ensure a corresponding fast response in the vehicle deceleration, the invention provides that, in the case of prompted reduction of the drive torque, simultaneously with the delayed drive torque reduction, for achieving a defined vehicle deceleration, a corresponding triggering of a vehicle brake system takes place, particularly by an active braking intervention. Via this method, the drive train is therefore only minimally (or not at all) relieved in this critical phase during the load shedding, and the negative engine rotational speed gradient is considerably reduced by the softer torque guidance forming and the corresponding connected lack of a drive train load relief.

Since exhaust gas turbocharger pumping occurs only at very fast drive torque reductions, the vehicle brake system will therefore advantageously be triggered only when the gradient of the drive torque reduction is greater than a specified torque gradient threshold or only during a transition from a drive operation to a coasting operation of the vehicle. Otherwise, the required vehicle deceleration can take place solely by the correspondingly designed or further developed guidance former.

In order to be able to achieve a suitable vehicle deceleration or a vehicle deceleration to be expected by the driver, for example, the desired deceleration, which in turn can be determined from the present accelerator pedal gradient during the release of the accelerator pedal, can be evaluated as the command variable for the required brake management. That is, the vehicle deceleration or the braking torque to be set for that purpose, in an advantageous embodiment of the invention, is defined as a function of the drive torque reduction prompted by the driver and/or by the gradient of the prompted drive torque reduction. As an alternative or in addition, the current dynamics design of the motor vehicle may also be included in the triggering of the brake system, particularly for the determination of the desired vehicle deceleration or of the braking torque to be set for this purpose. If, with respect to its dynamics, the vehicle, for example, has a very sporty design, the vehicle deceleration during the load shedding desired or expected by the driver would therefore be greater than in the case of a vehicle designed for comfort.

A number of advantages are obtained on the basis of the method according to the invention. Therefore, in addition to the above-mentioned advantage, a significant further advantage of the invention is the fact that no additional hardware components in the vehicle are required for the implementation of the method according to the invention, so that the implementation is relatively cost-effective by use of a correspondingly designed software module in the engine control unit. If the braking system is an electric system, the deceleration intervention can also be implemented very easily and efficiently.

Furthermore, the entire drive train will be protected by the clear reduction of load variation peaks. This also results in an increased degree of freedom in the design of the rigidity of the drive train, for example, in the interest of acoustic optimizations of the humming and vibration behavior of the vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
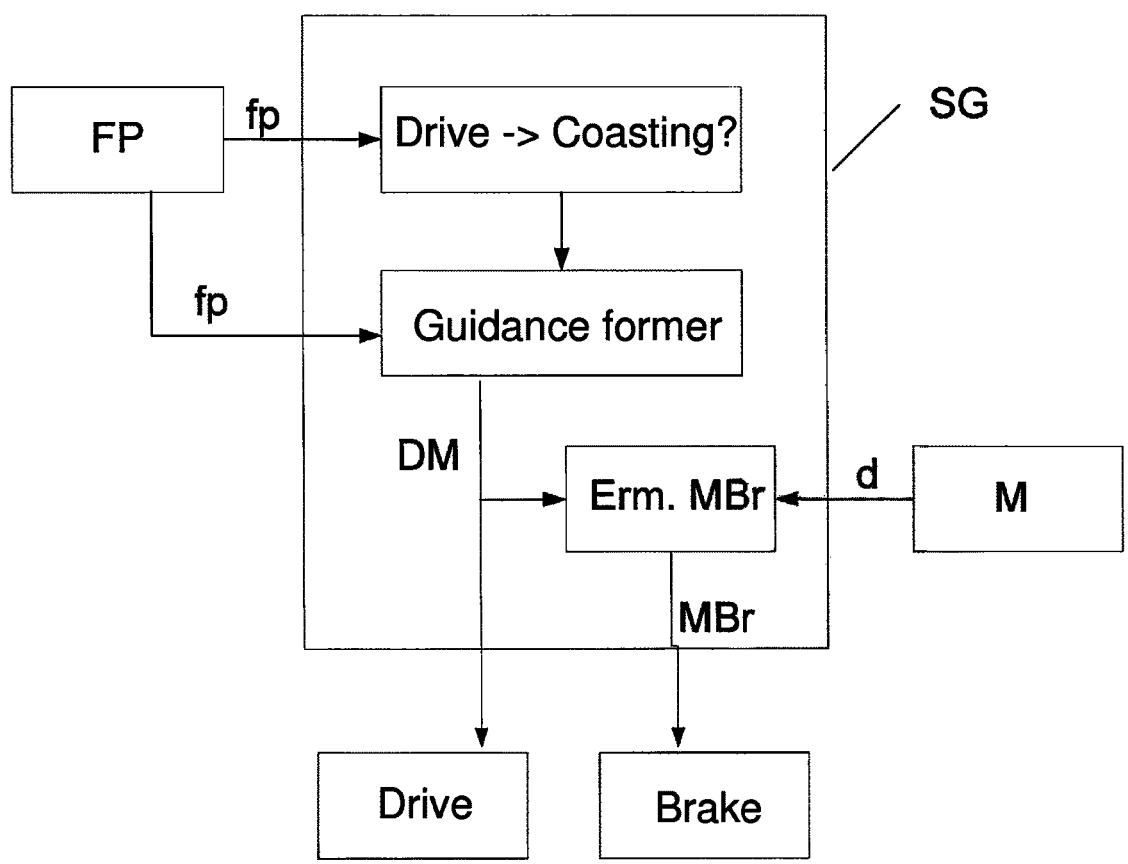
FIG. 1 is a simplified block diagram view of the control device for implementing a further development of the method of driving a vehicle according to the invention.

FIG. 1 is a very simplified block diagram view of an engine control unit SG of a motor vehicle (not shown), which receives at least one signal fp from the accelerator pedal FP. This signal fp represents a value of the drive torque fp prompted by the driver. The control unit SG further receives a signal d from a mode unit M, which signal d indicates to the control unit SG which dynamics mode d was currently present or selected for the vehicle. The dynamics mode d may, for example, be selected by the driver via a corresponding operating element.

In a first processing unit in the control unit SG, it is checked by means of the signal fp from the accelerator pedal FP whether a load change, thus a change from a drive operation to a coasting operation, is present or prompted. If this is so, in a second processing unit, the prompted drive torque fp is filtered out from the drive torque fp prompted by the driver via a guidance former, such that a decelerated or slowed-down drive torque reduction will occur. In this case, the guidance former is further developed such that no turbocharger pumping is generated by the set drive torque. This changed drive torque signal DM is output to the corresponding actuators for triggering the drive. Simultaneously, as a function of the current dynamics design d and the gradient of the prompted drive torque design fp and the determined drive torque DM, a brake signal MBr is determined for triggering the vehicle brake. The brake signal MBr is transmitted to the brake or the brake triggering control. Therefore, in this critical phase, the drive train is only minimally, or not at all relieved, during the load shedding, and the engine rotational speed gradient is considerably reduced by the softer torque guidance forming. Simultaneously, the vehicle deceleration expected by the driver is achieved by the braking intervention.

Figure 2:
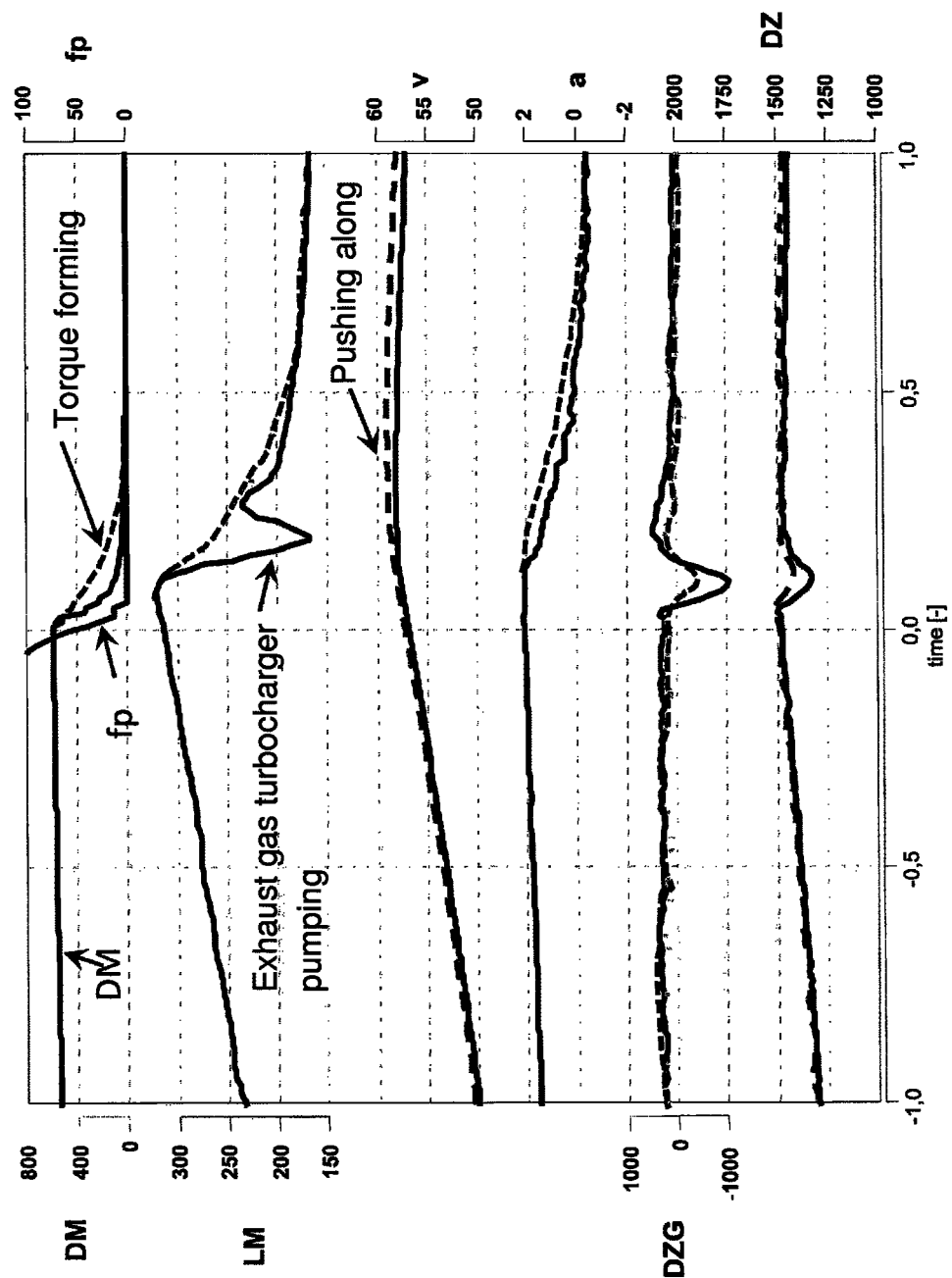
FIG. 2 is a graphical diagram for showing various signals.

FIG. 2 illustrates various signals and their change during a corresponding drive control when using a guidance former which results in no turbocharger pumping. In each case, the solid line shows the signal that would occur in the case of a conventional triggering, and the broken-line signal shows the course when a correspondingly further developed guidance former is used.

In the top representation, the signal fp shows the actuation of the accelerator pedal during a change from almost full load (approx. 80%) to a release of the accelerator pedal (0%). A torque DM according to the second line occurs as a result of the accelerator actuation.

When no guidance former or a very "slight" guidance former is used, the so-called exhaust gas turbocharger pumping will occur (compare the LM signal). By means of this rapid reduction of the drive torque and the bump stop change in the drive train, a pronounced negative engine rotational speed gradient DZG will briefly occur. The rotational speed DZ will also briefly drop considerably.

When the guidance former is now designed such that the torque decreases in a significantly softer manner (compare broken DM line), a significantly slower drop of the air flow LM delivered by the turbocharger and a lower negative rotational speed gradient DZG will occur; i.e. there is no exhaust gas turbocharger pumping. However, at the same time, the vehicle is not braked as rapidly, which is manifested by the signal course of the vehicle velocity v ("pushing along") and of the vehicle acceleration a. In order to nevertheless be able to at least almost reach a vehicle deceleration to be expected by the driver corresponding to the original course of the vehicle velocity v or of vehicle acceleration a, according to the invention, the brake system is simultaneously correspondingly triggered, so that the change in the vehicle velocity v or in the vehicle acceleration a can be compensated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a motor vehicle equipped with at least one drive unit configured to output a drive torque, the method comprising the acts of:

receiving a signal from an accelerator pedal, wherein the signal represents a drive torque made by a driver by operating the accelerator pedal to rapidly change a position of the accelerator pedal;

determining whether a load change occurs based on the received signal;

based on the act of determining whether the load change occurs, filtering out the drive torque, via one or more of: (i) a torque I/O module and (ii) an accelerator pedal filter, such that a decelerated or a slowed-down drive torque reduction occurs; and simultaneous with the occurrence of the decelerated or the slowed-down drive torque reduction, determining a brake signal and transmitting the brake signal to a vehicle brake system for correspondingly actuating the vehicle brake system to provide a predefined deceleration of the motor vehicle.

2. The method according to claim 1, further comprising the act of:

carrying out the slowed-down drive torque reduction such that substantially no flow-back of air flow compressed in a turbo charger of the motor vehicle occurs toward an intake side.

3. The method according to claim 2, further comprising the act of:

actuating the vehicle brake system only when a gradient of the drive torque is greater than a specified torque gradient threshold.

4. The method according to claim 2, further comprising the act of:

actuating the vehicle brake system only at a transition from a drive operation to a coasting operation of the motor vehicle.

5. The method according to claim 1, further comprising the act of:

actuating the vehicle brake system only when a gradient of the drive torque is greater than a specified torque gradient threshold.

6. The method according to claim 1, further comprising the act of:

actuating the vehicle brake system only at a transition from a drive operation to a coasting operation of the motor vehicle.

7. The method according to claim 1, wherein a brake torque generated for achieving the predefined deceleration of the motor vehicle is defined as a function of a reduction of the drive torque made by the driver and/or by a gradient of the reduction of the drive torque.

8. The method according to claim 7, wherein a brake torque generated for achieving the predefined deceleration of the motor vehicle is defined as a function of current dynamics design of the motor vehicle.

9. The method according to claim 1, wherein a brake torque generated for achieving the predefined deceleration of the motor vehicle is defined as a function of current dynamics design of the motor vehicle.

* * * * *